United States Patent
Gardner (10) Patent No.: US 9,885,887 B2
(45) Date of Patent: Feb. 6, 2018

(54) METHOD OF DETERMINING EYEGLASS FRAME MEASUREMENTS FROM AN IMAGE BY EXECUTING COMPUTER-EXECUTABLE INSTRUCTIONS STORED ON A NON-TRANSITORY COMPUTER-READABLE MEDIUM

(71) Applicant: Kurt Matthew Gardner, Coral Springs, FL (US)

(72) Inventor: Kurt Matthew Gardner, Coral Springs, FL (US)

( * ) Notice: Subject to any disclaimer, the term of this patent is extended or adjusted under 35 U.S.C. 154(b) by 0 days.

(21) Appl. No.: 15/136,859

(22) Filed: Apr. 22, 2016

(65) Prior Publication Data

US 2016/0313576 A1    Oct. 27, 2016

Related U.S. Application Data (60) Provisional application No. 62/151,270, filed on Apr. 22, 2015.

(51) Int. Cl.
*G06T 7/60* (2017.01)
*G06T 7/62* (2017.01)
*G06T 7/70* (2017.01)
*G02C 13/00* (2006.01)

(52) U.S. Cl.
CPC .............. *G02C 13/003* (2013.01); *G06T 7/62* (2017.01); *G06T 2207/30201* (2013.01)

(58) Field of Classification Search
CPC ............ G06T 2207/30201; G06T 7/62; G02C 13/003
See application file for complete search history.

(56) References Cited

U.S. PATENT DOCUMENTS

| | | | | |
|---|---|---|---|---|
| 7,768,516 | B1 * | 8/2010 | Bourdev | G06T 1/20 345/501 |
| 9,033,496 | B2 * | 5/2015 | Divo | A61B 3/18 351/204 |
| 9,378,581 | B2 * | 6/2016 | Gray | G06F 3/04895 |
| 9,398,253 | B2 * | 7/2016 | Lee | H04N 7/147 |
| 9,529,213 | B2 * | 12/2016 | Fonte | G06Q 30/0621 |
| 9,563,805 | B2 * | 2/2017 | Cheung | A61B 3/113 |
| 9,703,122 | B2 * | 7/2017 | Haddadi | G02C 13/005 |
| 2003/0081173 | A1 * | 5/2003 | Dreher | G02C 13/003 351/204 |
| 2003/0090625 | A1 * | 5/2003 | Izumitani | G02C 13/003 351/204 |

(Continued)

OTHER PUBLICATIONS

Borza, D. "Eyeglasses Lens Contour Extraction from Facial Images Using an Efficient Shape Description" Sensors, 2013, 13, Oct. 2013, pp. 13638-13658.*

(Continued)

*Primary Examiner* — Chan Park
*Assistant Examiner* — Mia M Thomas (57) ABSTRACT

A method of determining eyeglass fitting measurements from an image for a vision treatment analyzes a source image of an individual wearing a known pair of eyeglass frames. Dimensions specifications are acquired from the manufacturer of the frames, and corresponding dimensions are measured from the image using image recognition software. Various scaling and trigonometric calculations are performed in order to acquire measurements specific to the patient for fitted eyeglass frames.

9 Claims, 9 Drawing Sheets

(56) References Cited

U.S. PATENT DOCUMENTS

| | | | |
|---|---|---|---|
| 2004/0004633 A1* | 1/2004 | Perry | G06Q 30/0603 715/728 |
| 2004/0189935 A1* | 9/2004 | Warden | G02C 7/027 351/204 |
| 2007/0118428 A1* | 5/2007 | Akiyama | A61B 3/10 351/206 |
| 2009/0051871 A1* | 2/2009 | Warden | G02C 13/005 351/204 |
| 2011/0182472 A1* | 7/2011 | Hansen | A61B 3/113 382/103 |
| 2013/0088490 A1* | 4/2013 | Rasmussen | G06T 17/00 345/421 |
| 2013/0141324 A1* | 6/2013 | Zambrano | G06F 3/012 345/156 |
| 2015/0042558 A1* | 2/2015 | Massonneau | G06F 3/005 345/156 |
| 2015/0085244 A1* | 3/2015 | Carter | G02C 3/003 351/140 |
| 2015/0103190 A1* | 4/2015 | Corcoran | G02B 27/646 348/208.2 |
| 2015/0293382 A1* | 10/2015 | Jethmalani | G02C 13/005 351/204 |
| 2016/0062151 A1* | 3/2016 | Fonte | G06Q 30/0621 351/204 |
| 2016/0202498 A1* | 7/2016 | Ozaki | G02C 13/003 351/204 |
| 2017/0119298 A1* | 5/2017 | Cheung | A61B 5/18 |
| 2017/0147859 A1* | 5/2017 | Zhang | G02B 27/0093 |
| 2017/0168323 A1* | 6/2017 | Gardner | G02C 13/005 |

OTHER PUBLICATIONS

Kreutzer, L. "Image Processing Automates Eyeglass Fitting for Rodenstock" http://www.mvtec.com/, pp. 1-2.*

* cited by examiner

METHOD OF DETERMINING EYEGLASS FRAME MEASUREMENTS FROM AN IMAGE BY EXECUTING COMPUTER-EXECUTABLE INSTRUCTIONS STORED ON A NON-TRANSITORY COMPUTER-READABLE MEDIUM

The current application claims a priority to the U.S. Provisional Patent application Ser. No. 62/151,270 filed on Apr. 22, 2015.

FIELD OF THE INVENTION

The present invention relates generally to eye care. More particularly, the present invention relates to a method for accurately determining eyeglass fitting measurements from a digital image.

BACKGROUND OF THE INVENTION

In most cases an individual must go to an eye care professional to have measurements of their head taken to determine the correct eyeglass frame dimensions. Going to an eye care professional requires appointments to be made, which may not align with an individual's schedule. This method can prove to be time consuming and inconvenient for busy individuals and serves to standardize the skill set to take the measurements, which, when done manually, can lead to significant errors. Alternatively, there are methods of determining eyeglass fitting measurements using multiple images with attachments to the frame which currently exist in the market. Many times methods such as this still involve the individual having to go in to see an eye care professional to get the proper pictures taken, leading to the same issue of time and convenience. Further, some methods do not require an individual to physically visit an eye care professional as they can take the required photos on their own and upload them onto the eye care provider's website. Although this method is quicker and more convenient than the aforementioned methods, an individual may not properly take the photos. This may result in inaccurate and incomplete results, having to retake the photos and overall may lead to more inconvenience and time wasted, and existing methods cannot complete all measurements required to make modern eyewear.

The present invention aims to solve the problems with determining eyeglass fitting measurements mentioned above. With the present invention, an individual will be able to take any front facing photo of themselves wearing a known pair of eye glass frames and determine accurate eyeglass fitting measurements for that individual. In addition, existing photos can be used as long as the individual is wearing a known pair of eyeglass frames. Through scaling methods and trigonometry, an individual will not need to take multiple images (of the sides of the head, etc.) to accurately fit eye glass frames. Frame measurements can accurately be taken in the comfort of one's home, saving time and energy, as well as ensuring consistency that may not be adequately provided by an eye care professional.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

Figure 1:
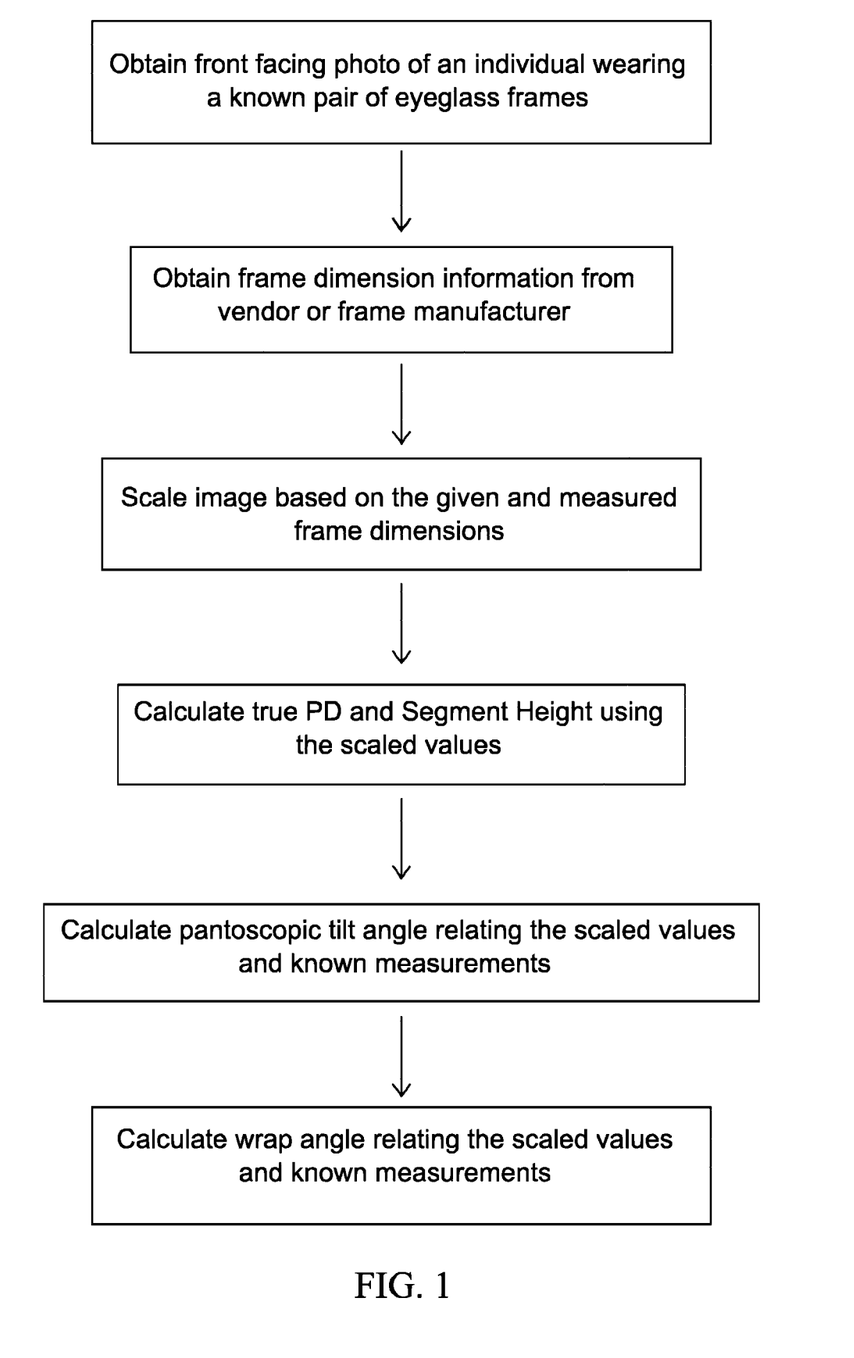
FIG. 1 is a stepwise flow diagram depicting the general process of the present invention.

The present invention takes patient measurements for properly fitting eyeglasses with the use of a single image of the wearer who is wearing a known frame. By using an image of the patient wearing a selected frame, image scaling methods and trigonometric functions, the measurements specific to the patient can be accurately and consistently determined. The user will no longer have to take a plurality of specific photos to properly fit eyeglass frames using this method. In other words, one front facing photo will be all that is needed. The general process is depicted in FIG. 1.

To facilitate the present invention, an image recognition software must be provided for use. The image recognition software may be any collection of programming code, compiled or otherwise, machine instructions, or any type of computer-executable instructions that provides the ability to analyze an image in order to recognize the required components from the image as detailed hereinafter. The image recognition software may be a single software package with all the necessary capabilities, or the image recognition software may be multiple software packages each providing one or more of said capabilities.

Figure 5:
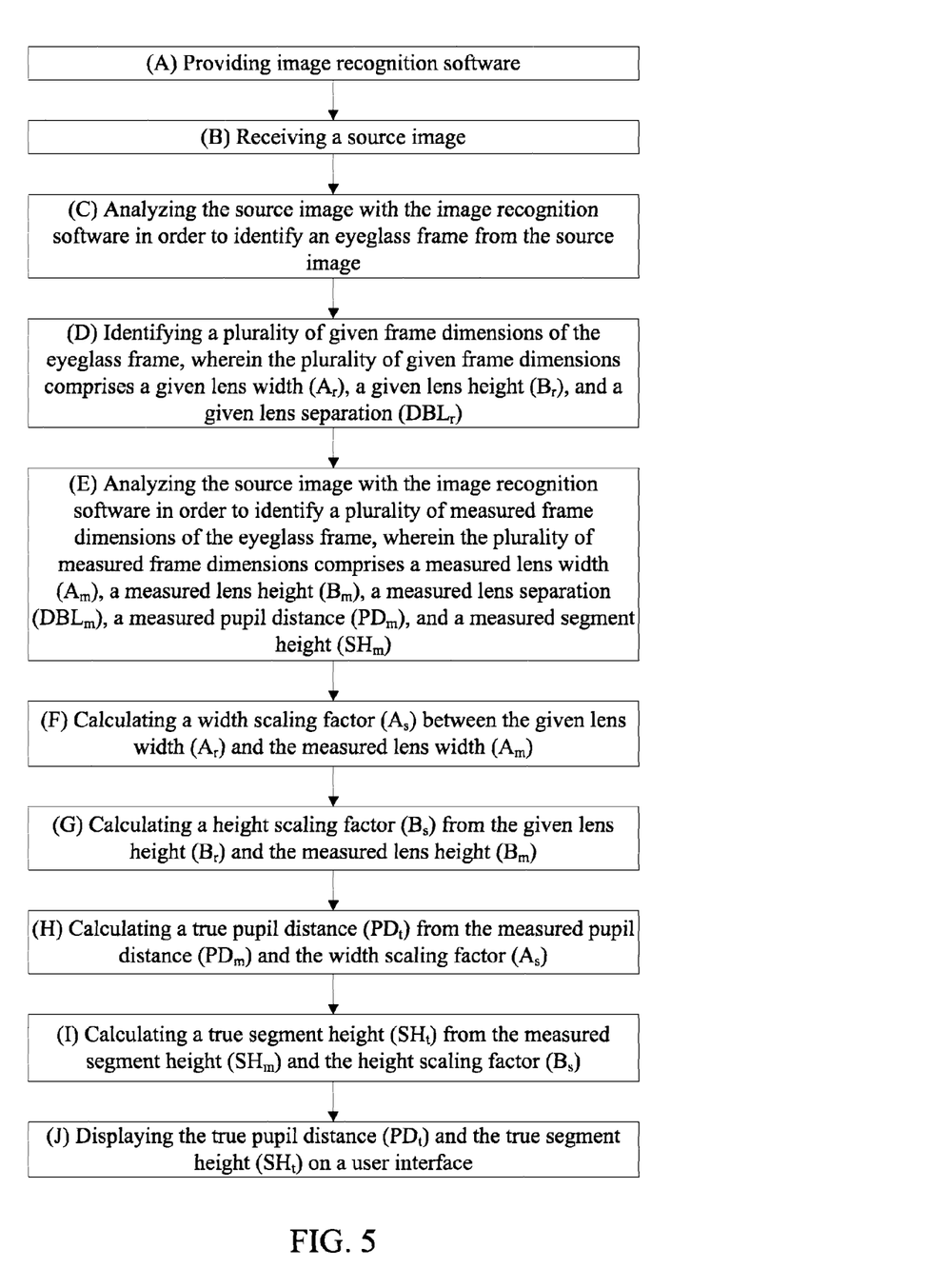
FIG. 5 is a stepwise flow diagram describing the steps for implementing the general method of the present invention.

In reference to FIG. 5, to initiate the general process of the present invention, a source image is received. The source image may be received from any applicable digital file transfer means and may be stored on and read from any digital file storage implementation. To properly enable the present invention, the source image must contain a front facing photo of a person's head, with the person wearing a known pair of eyeglasses. The eyeglasses worn by the user must be recognizable enough to look up the manufacturers details on the dimensions. This is the key to making the present invention function correctly. The real dimensions obtained from the manufacturer will be used to properly scale the image to the correct size as the photos used for the present invention may vary in size. The individual must be wearing a known pair of glasses. The user does not necessarily need to take a new photograph. An existing photograph of an individual wearing a known pair of glasses will work with the present invention. For example, an individual may be able to use one of their photos from a social media website.

The source image is then analyzed with the image recognition software in order to identify an eyeglass frame from the source image. Identifying the presence of an eyeglass frame is critical to the purpose of the present invention, and if no eyeglass frame can be identified from the source image the present invention cannot function properly.

It is further important to identify the specific model of the eyeglass frame in the source image in order to facilitate the acquisitions of manufacturer specifications for the dimensions of the eyeglass frame. In one embodiment, a frame model designation is received through a user interface. In another embodiment, the frame model designation of the eyeglass frame is identified from the source image with the image recognition software.

Figure 2:
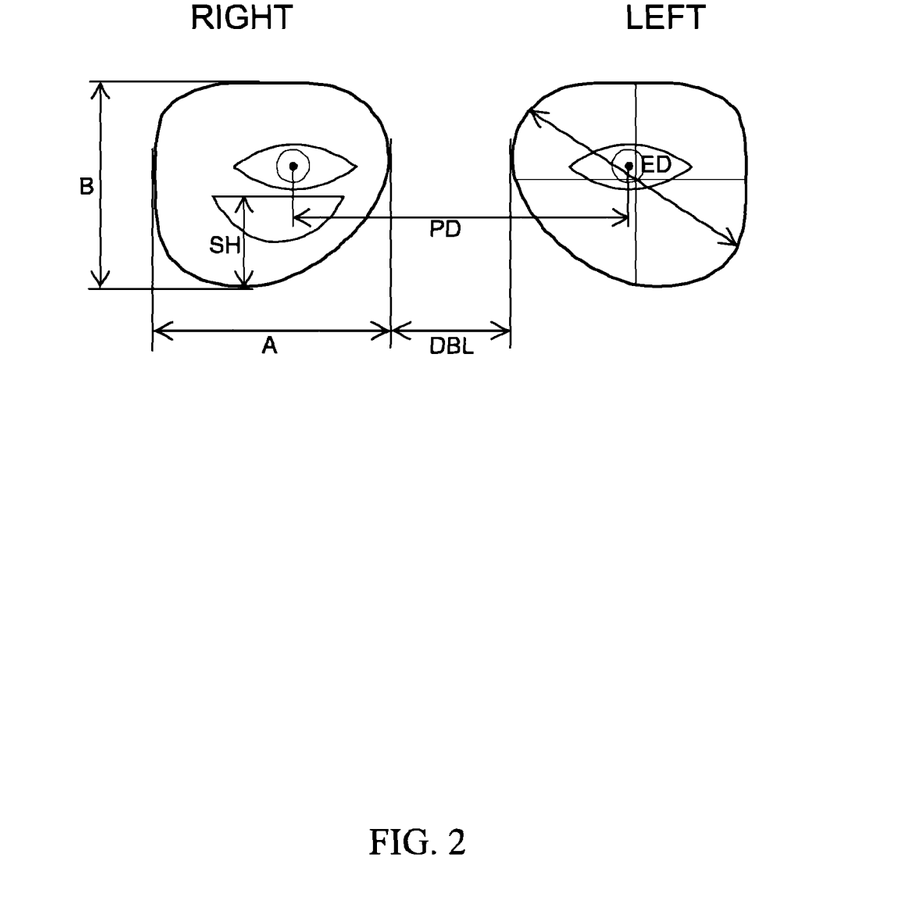
FIG. 2 is an illustrated front view of the lenses of an eyeglass frame showing various dimensions of the frame.
Figure 7:
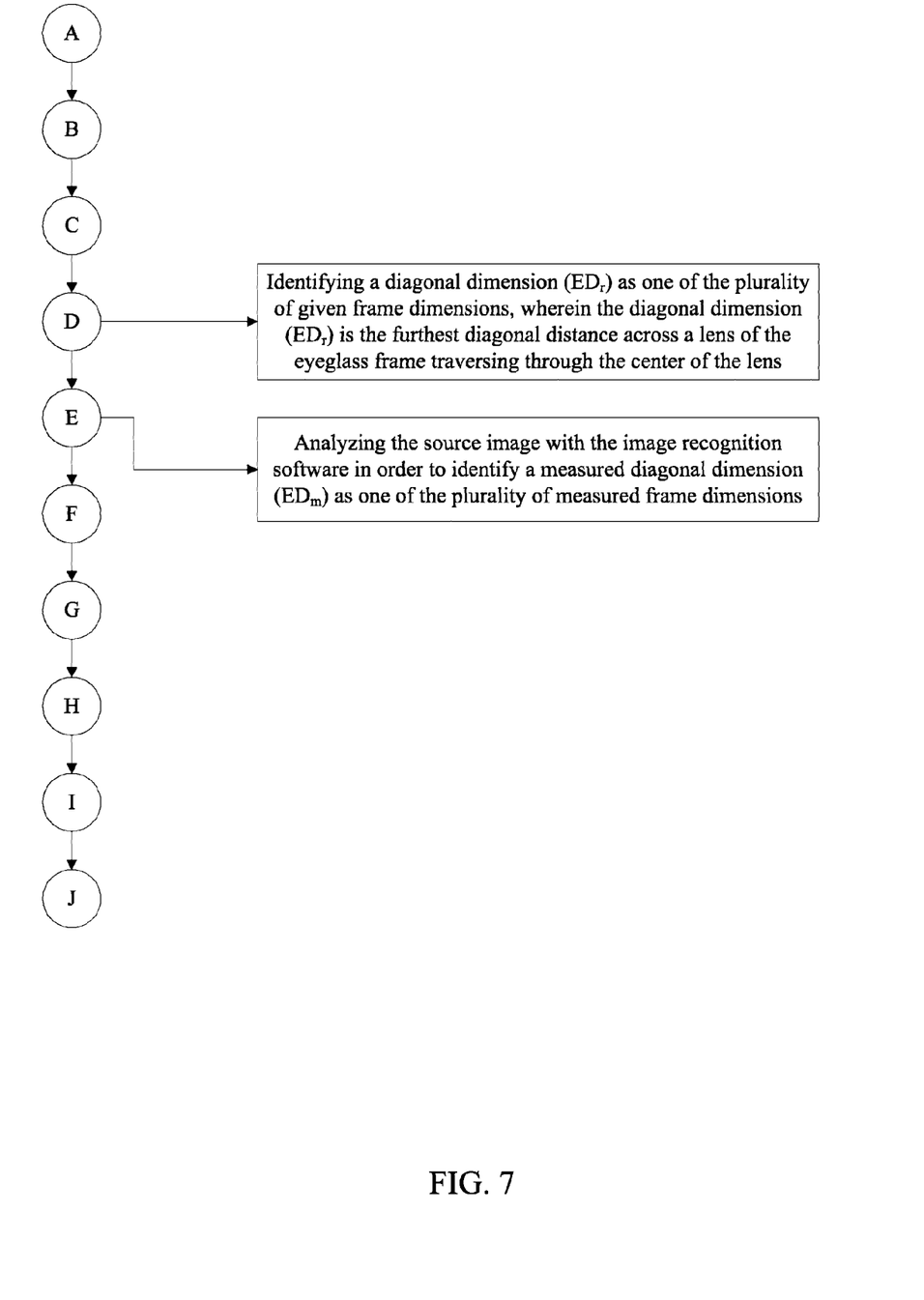
FIG. 7 is a stepwise flow diagram describing steps for further identifying a diagonal dimension as one of the given frame dimensions.

Referring to FIG. 2, a plurality of given frame dimensions of the eyeglass frame are then identified. In the preferred embodiment of the present invention, the plurality of given frame dimensions comprises a given, or real, lens width ($A_r$), a given lens height ($B_r$), and a given lens separation ($DBL_r$). In one embodiment described in FIG. 7, a diagonal dimension ($ED_r$) may further be identified as one of the plurality of given frame dimensions. The diagonal dimension $ED_r$ is the furthest diagonal distance across a lens of the eyeglass frame traversing through the center of the lens. The subscript "r" herein refers to the "real" dimension as specified by the manufacturer of the eyeglass frame. It should be understood that all variable nomenclature herein is arbitrary and is not intended in any way to limit the scope of the present invention.

Figure 6:
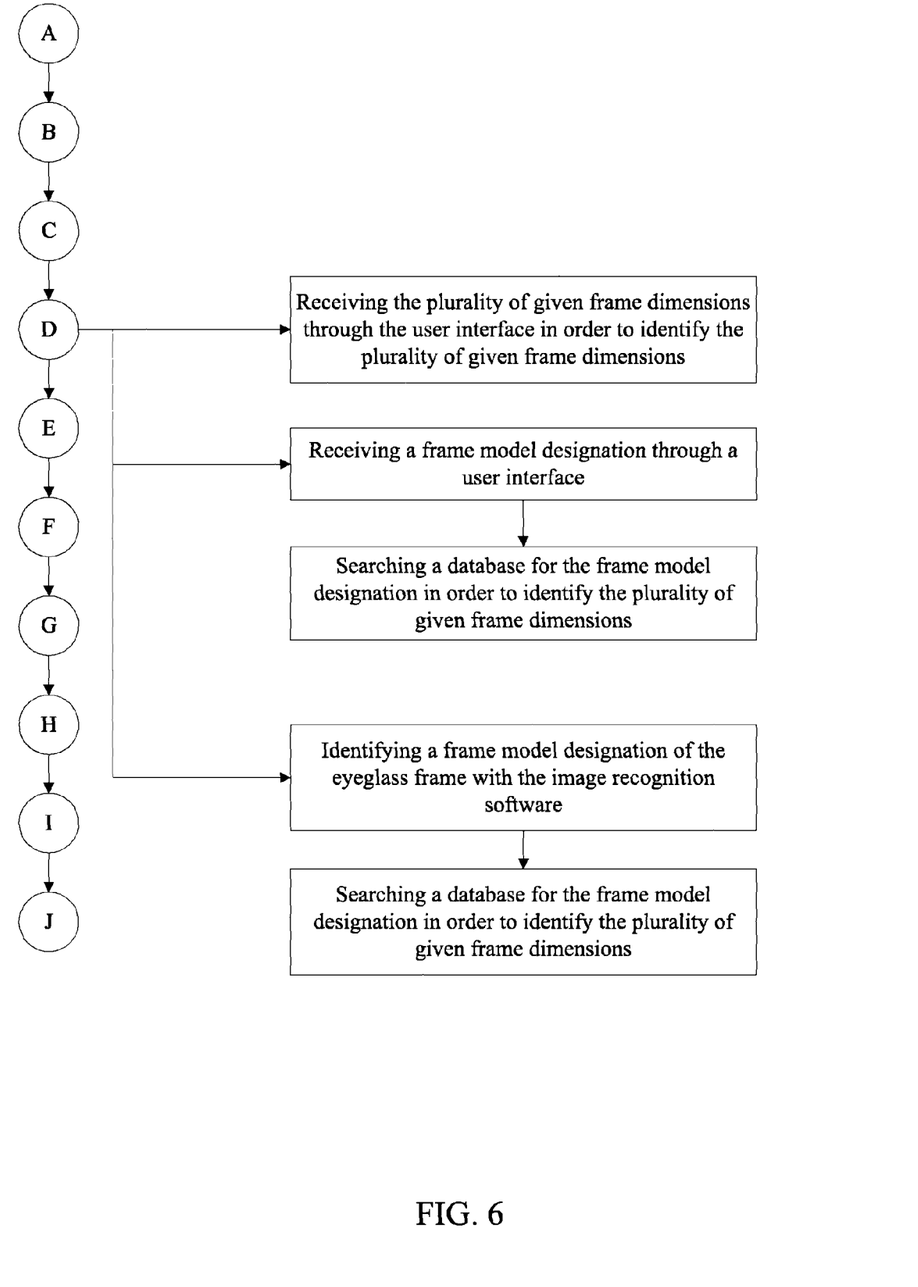
FIG. 6 is a stepwise flow diagram describing steps for identifying the plurality of given frame dimensions.

Referring to FIG. 6, the plurality of given frame dimensions may be identified by various different means. In one embodiment, after the frame model designation is identified, a database is then searched for the frame model designation in order to identify the plurality of given frame dimensions. In one embodiment, a user must manually retrieve the plurality of given frame dimensions from a manufacturer database or other data source. The user then enters the plurality of given frame dimensions through a user interface, thus identifying the plurality of given frame dimensions.

The image recognition software additionally analyzes the source image in order to identify a plurality of measured frame dimensions (denoted by the subscript "m" herein). In the preferred embodiment of the present invention, the plurality of measured frame dimensions comprises a measured lens width ($A_m$), a measured lens height ($B_m$), a measured lens separation ($DBL_m$), a measured pupil distance ($PD_m$), and a measured segment height ($SH_m$). In one embodiment, a measured diagonal dimension ($ED_m$) is further identified from the source image with the image recognition software as one of the plurality of measured frame dimensions.

The measured lens width $A_m$ is the furthest horizontal dimension of the lens. The measured lens height $B_m$ is the furthest vertical dimension of the lens. The measured lens separation $SH_m$ is the closest horizontal distance between the two lenses of the eyeglass frame in the source image. The measured pupil distance $PD_m$ is the horizontal distance measured between the subject's pupils in the source image. The measured segment height $SH_m$ is the vertical distance from the bottom of the lens to the beginning of a progressive addition on a progressive lens, or to the top line of a lined bifocal. The measured diagonal dimension $ED_m$ is the measured furthest diagonal distance across the lens of the eyeglass frame which traverses through the center of the lens.

After the plurality of given frame dimensions and the plurality of measured frame dimensions are identified, various calculations are subsequently performed. Using the known dimensions of the frame given by the vendor and the measured dimensions of the frame from the photo, the correct scaling factors are determined. By dividing the real values by the measured, a scaling factor can be determined. The term real will refer to the given dimensions from the manufacturer and the term measured will refer to the measured dimensions from the photos.

A width scaling factor ($A_s$) is calculated between $A_r$ and $A_m$. More specifically, $A_s$ is calculated as a ratio of $A_r$ to $A_m$, and even more specifically, in one embodiment $A_s$ is calculated according to the equation $$A_s = \frac{A_m}{A_r}.$$

It should be understood herein that while various ratios and scaling factors are defined, the numerators and denominators may be reversed in various relevant instances to produce the same result.

Similarly, a height scaling factor ($B_s$) is calculated between $B_r$ and $B_m$. More specifically, $B_s$ is calculated as a ratio of $B_r$ to $B_m$, and even more specifically, in one embodiment $B_s$ is calculated according to the equation $$B_s = \frac{B_m}{B_r}.$$

The scaling factors $A_s$ and $B_s$ will enable the user to scale any measured dimensions on the frame to their true values. Once these values have been obtained, the measured PD and segment height will be scaled to their true values, giving an accurate measurement of these two dimensions.

A true pupil distance ($PD_t$) is then calculated from $PD_m$ and $A_s$. More specifically, $PD_t$ is calculated according to the equation $$PD_t = \frac{PD_m}{A_s}.$$

A true segment height ($SH_t$) is also calculated from $SH_m$ and $B_s$. More specifically, $SH_t$ is calculated according to the equation $$SH_t = \frac{SH_m}{B_s}.$$

Both PD and SH can also be calculated with half of the DBL to the scaled PD of either the left or right eyes. The SH can be calculated monocularly by performing the SH equation for both the right and left eye. In order to ensure proper PD, the $A_m$ of each eye is compared, by dividing the shorter $A_m$ by the longer $A_m$, giving a ratio that is applied to the shortest PD, and then the inverse is applied to the longest PD and compared to the total PD: shortest PD+Longest PD+DBL=total PD.

Figure 3:
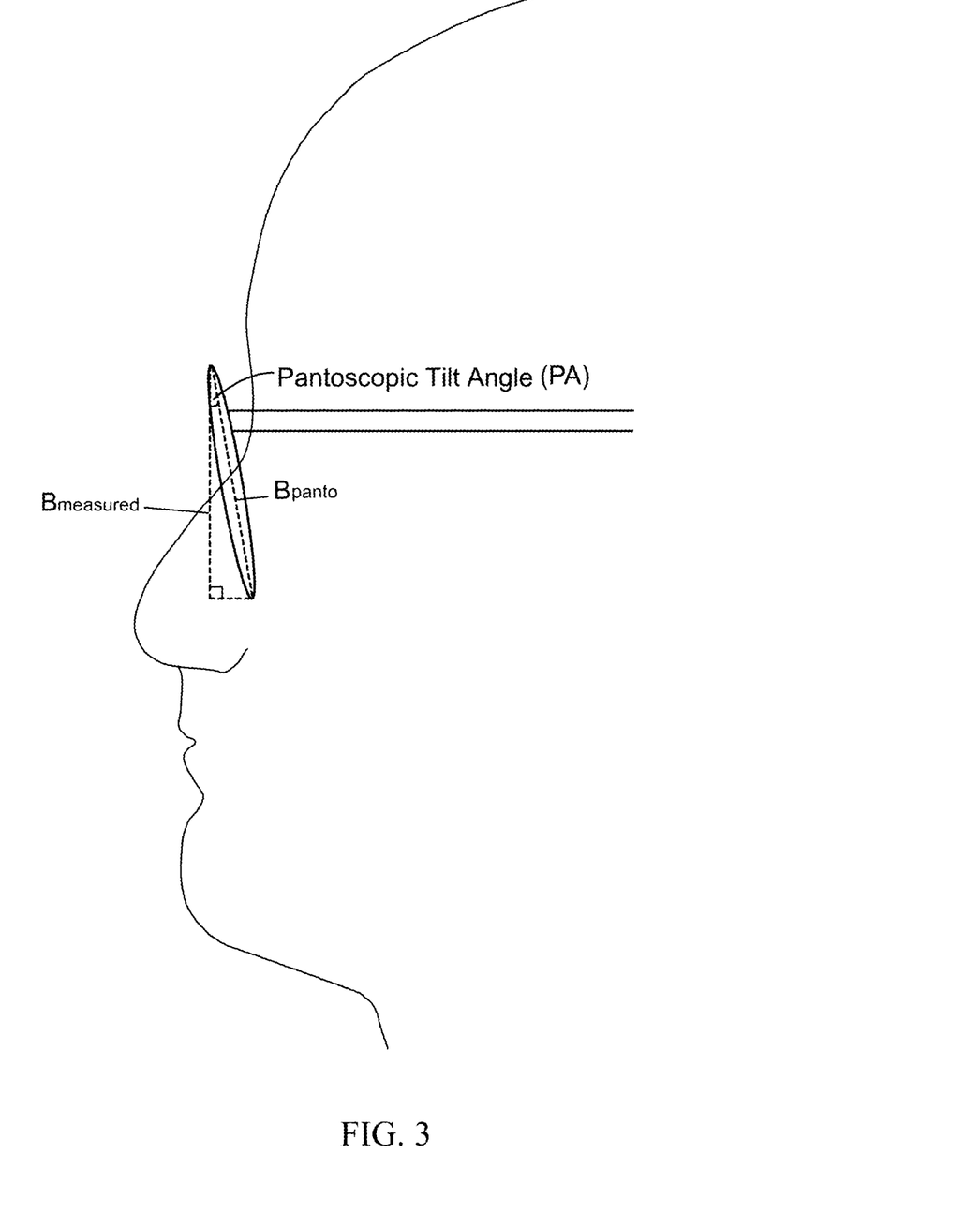
FIG. 3 is an illustrated side view depicting the right triangle used to calculate the pantoscopic tilt angle.
Figure 8:
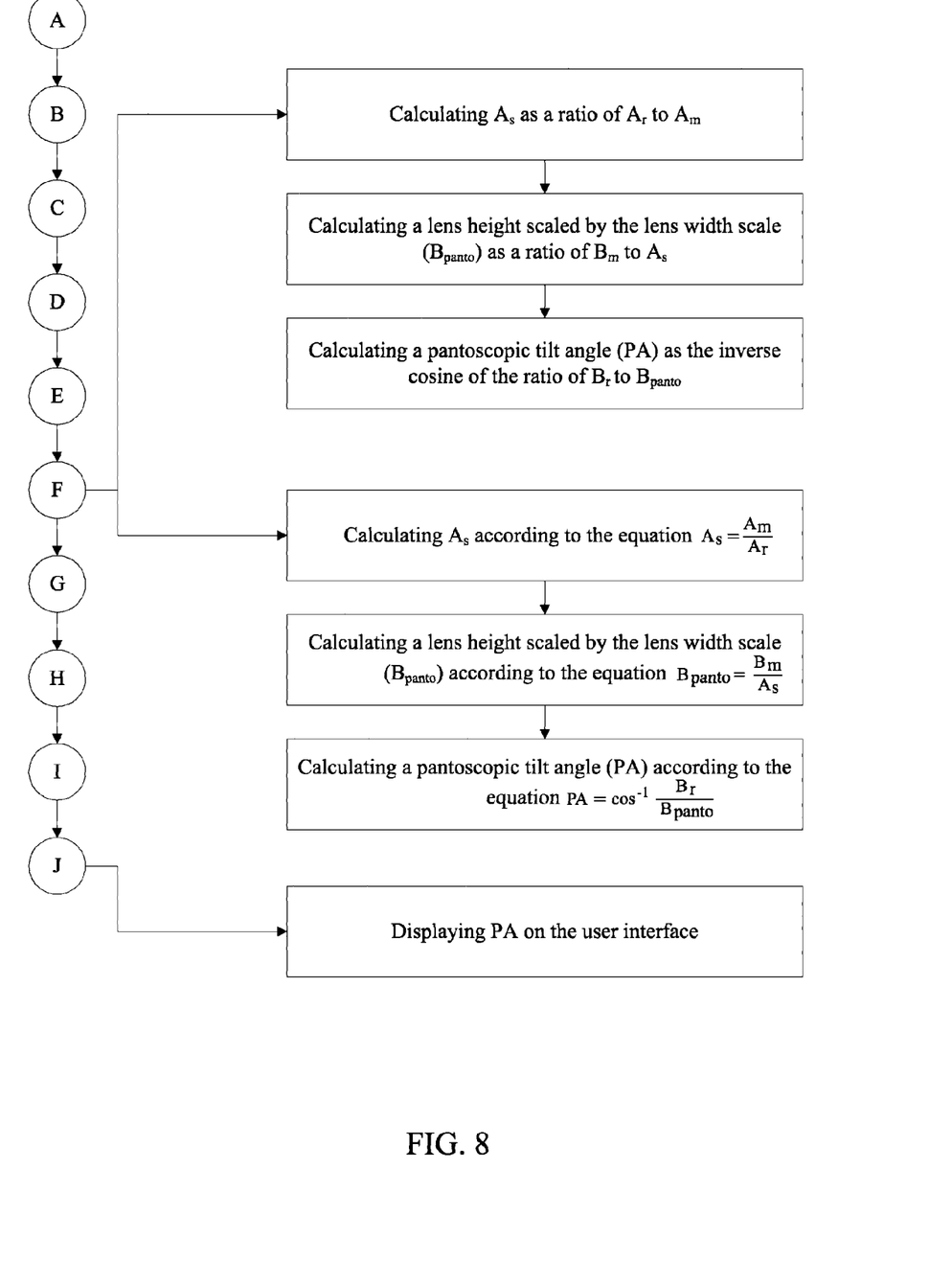
FIG. 8 is a stepwise flow diagram describing steps for calculating the pantoscopic tilt angle.

Referring to FIGS. 3 and 8, in one embodiment, a pantoscopic tilt angle (PA) is further calculated. The pantoscopic tilt requires the vertical measurements of the frame. By using the real, measured and scaled values, a right triangle can be formed to determine the correct pantoscopic tilt angle. This angle is calculated from using trigonometric formulas as shown below.

To this end, a lens height scaled by the lens width scale ($B_{panto}$) is calculated as a ratio of $B_m$ to $A_s$, and subsequently PA is calculated as the inverse cosine of the ratio of $B_r$ to $B_{panto}$. More specifically, $B_{panto}$ is calculated according to the equation $$B_{panto} = \frac{B_m}{A_s},$$

and PA is calculated according to the equation $$PA = \cos^{-1} \frac{B_r}{B_{panto}}.$$

Figure 4:
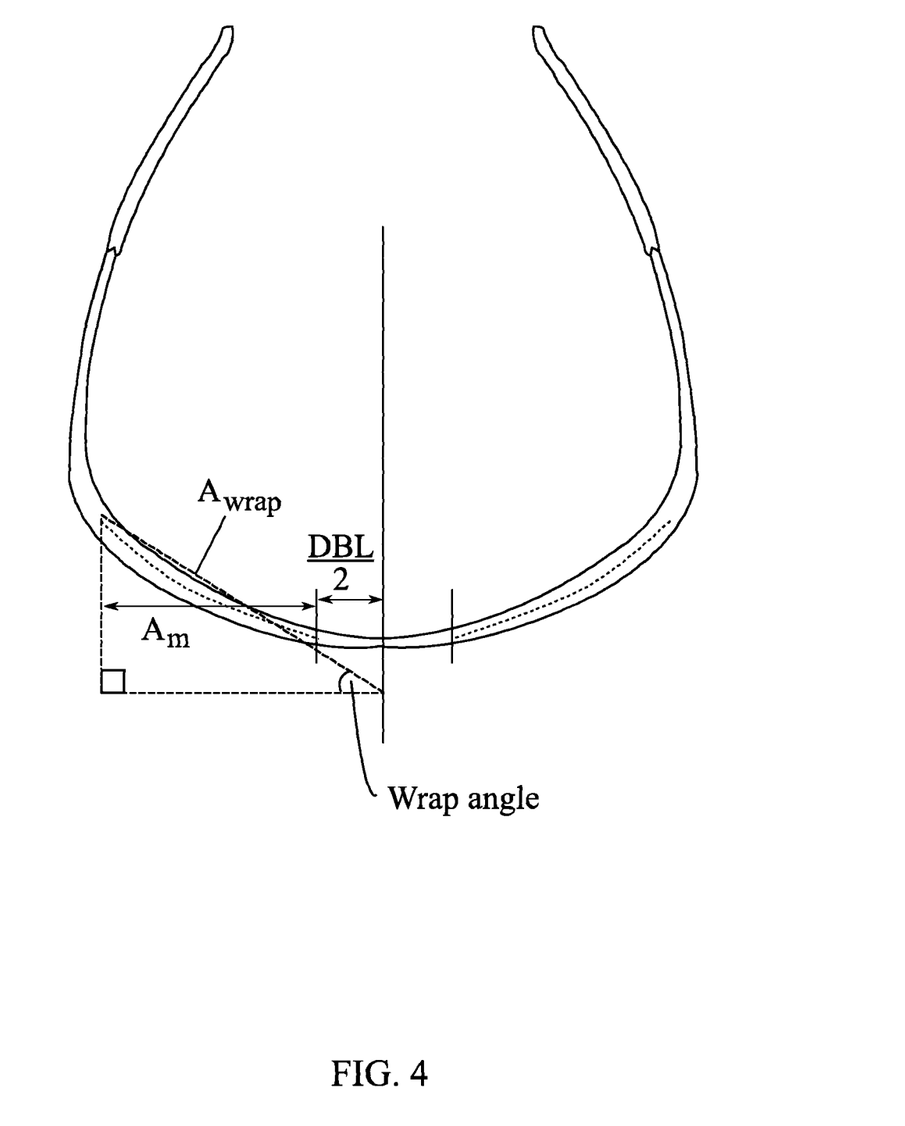
FIG. 4 is an illustrated top view depicting the right triangle used to calculated the wrap angle.
Figure 9:
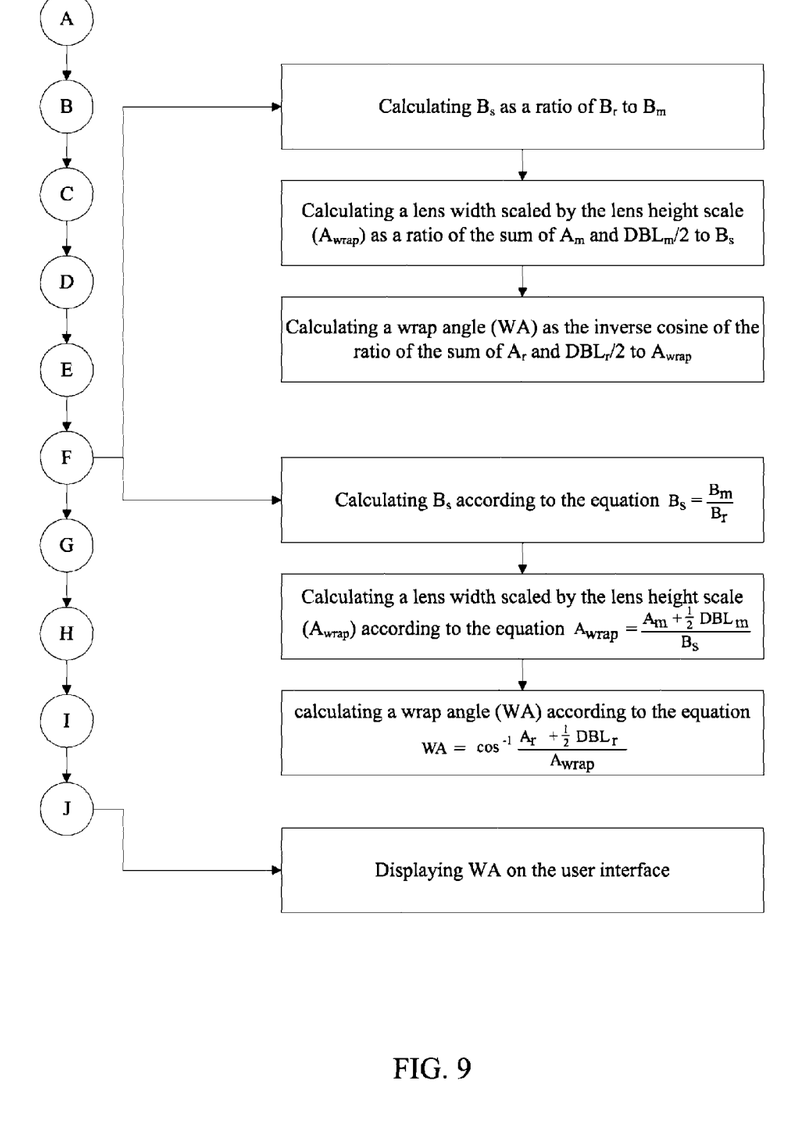
FIG. 9 is a stepwise flow diagram describing steps for calculating the wrap angle.

Referring to FIGS. 4 and 9, in one embodiment, the final step will be the calculation of the wrap angle (WA). This calculation is done similarly to the pantoscopic tilt calculation, but in the horizontal direction, rather than the vertical. By using the real, measured and scaled values, a right triangle can be formed to determine the correct wrap angle. This angle is calculated from using trigonometric formulas as shown below.

To this end, a lens width scaled by the lens height scale ($A_{wrap}$) is calculated as a ratio of the sum of $A_m$ and $$\frac{DBL_m}{2}$$

to $B_s$, and WA is calculated as the inverse cosine of the ratio of the sum of $A_r$ and $$\frac{DBL_r}{2}$$

to $A_{wrap}$. More specifically, $A_{wrap}$ is calculated according to the equation $$A_{wrap} = \frac{A_m + \frac{1}{2}DBL_m}{B_s},$$

and WA is calculated according to the equation $$WA = \cos^{-1} \frac{A_r + \frac{1}{2}DBL_r}{A_{wrap}}.$$

After the aforementioned calculations, $PD_t$, $SH_t$, PA and WA are stored in a database and displayed on the user interface in a formatted manner $PD_t$, $SH_t$, PA and WA may then be used to adequately fit a new eyeglass frame for the subject in the source image.

In summary, the entire process will be automated using software. The software will perform all of the necessary calculations. The user will only have to input specific information relating to the image at the beginning of the program. First, the user will be able to select the specific type of eyeglass frames the user is wearing in the photo. The software will automatically search a database for the dimension information for that specific frame. Measurements of the frame within the image will be taken and inputted by the user. The dimensions that must be entered may be listed with empty cells so that the user can simply enter the data that is needed. This will also prevent the user from taking any unnecessary measurements. From here on, the software will perform all necessary calculations to display the fitted frame dimensions. The dimensions will then be formatted and presented to the user.

Although the invention has been explained in relation to its preferred embodiment, it is to be understood that many other possible modifications and variations can be made without departing from the spirit and scope of the invention as hereinafter claimed.

What is claimed is:

1. A method of determining eyeglass fitting measurements from an image for a vision treatment by executing computer-executable instructions stored on a non-transitory computer-readable medium comprises the steps of:
   providing an image recognition software;
   providing a user interface;
   receiving a source image;
   analyzing the source image with the image recognition software in order to identify an eyeglass frame from the source image;
   identifying a plurality of given frame dimensions of the eyeglass frame, wherein the plurality of given frame dimensions comprises a given lens width ($A_r$), a given lens height ($B_r$), and a given lens separation ($DBL_r$);
   analyzing the source image with the image recognition software in order to identify a plurality of measured frame dimensions of the eyeglass frame, wherein the plurality of measured frame dimensions comprises a measured lens width ($A_m$), a measured lens height ($B_m$), a measured lens separation ($DBL_m$), a measured pupil distance ($PD_m$), and a measured segment height ($SH_m$);
   calculating a width scaling factor ($A_s$) between the given lens width ($A_r$) and the measured lens width ($A_m$);
   calculating a height scaling factor ($B_s$) from the given lens height ($B_r$) and the measured lens height ($B_m$);
   calculating a true pupil distance ($PD_t$) from the measured pupil distance ($PD_m$) and the width scaling factor ($A_s$);
   calculating a true segment height ($SH_t$) from the measured segment height ($SH_m$) and the height scaling factor ($B_s$);
   displaying the true pupil distance ($PD_t$) and the true segment height ($SH_t$) on the user interface; and
   obtaining a frame model designation of the eyeglass frame by performing at least one of receiving the frame model designation of the eyeglass frame through the user interface and identifying the frame model designation of the eyeglass frame with the image recognition software.

2. A method of determining eyeglass fitting measurements from an image for a vision treatment by executing computer-executable instructions stored on a non-transitory computer-readable medium as claimed in claim 1 comprises the step of:

receiving the plurality of given frame dimensions through the user interface in order to identify the plurality of given frame dimensions.

3. A method of determining eyeglass fitting measurements from an image for a vision treatment by executing computer-executable instructions stored on a non-transitory computer-readable medium as claimed in claim 1 comprises the steps of:

in response to receiving the frame model designation of the eyeglass frame through the user interface, searching a database for the frame model designation in order to identify the plurality of given frame dimensions.

4. A method of determining eyeglass fitting measurements from an image for a vision treatment by executing computer-executable instructions stored on a non-transitory computer-readable medium as claimed in claim 1 comprises the steps of:

in response to identifying the frame model designation of the eyeglass frame with the image recognition software, searching a database for the frame model designation in order to identify the plurality of given frame dimensions.

5. A method of determining eyeglass fitting measurements from an image for a vision treatment by executing computer-executable instructions stored on a non-transitory computer-readable medium as claimed in claim 1 comprises the steps of:

identifying a diagonal dimension ($ED_r$) as one of the plurality of given frame dimensions, wherein the diagonal dimension ($ED_r$) is the furthest diagonal distance across a lens of the eyeglass frame traversing through the center of the lens; and analyzing the source image with the image recognition software in order to identify a measured diagonal dimension ($ED_m$) as one of the plurality of measured frame dimensions.

6. A method of determining eyeglass fitting measurements from an image for a vision treatment by executing computer-executable instructions stored on a non-transitory computer-readable medium as claimed in claim 1 comprises the steps of:

calculating $A_s$ as a ratio of $A_r$ to $A_m$;
calculating a lens height scaled by the lens width scale ($B_{panto}$) as a ratio of $B_m$ to $A_s$; and
calculating a pantoscopic tilt angle (PA) as the inverse cosine of the ratio of $B_r$ to $B_{panto}$.

7. A method of determining eyeglass fitting measurements from an image for a vision treatment by executing computer-executable instructions stored on a non-transitory computer-readable medium as claimed in claim 1 comprises the steps of:

calculating $A_s$ according to the equation $$A_s = \frac{A_m}{A_r};$$

calculating a lens height scaled by the lens width scale ($B_{panto}$) according to the equation $$B_{panto} = \frac{B_m}{A_s};$$

calculating a pantoscopic tilt angle (PA) according to the equation $$PA = \cos^{-1}\frac{B_r}{B_{panto}};$$

and
displaying PA on the user interface.

8. A method of determining eyeglass fitting measurements from an image for a vision treatment by executing computer-executable instructions stored on a non-transitory computer-readable medium as claimed in claim 1 comprises the steps of:

calculating $B_s$ as a ratio of $B_r$ to $B_m$;
calculating a lens width scaled by the lens height scale ($A_{wrap}$) as a ratio of the sum of $A_m$ and $$\frac{DBL_m}{2}$$

to $B_s$; and
calculating a wrap angle (WA) as the inverse cosine of the ratio of the sum of $A_r$ and $$\frac{DBL_r}{2}$$

to $A_{wrap}$.

9. A method of determining eyeglass fitting measurements from an image for a vision treatment by executing computer-executable instructions stored on a non-transitory computer-readable medium as claimed in claim 1 comprises the steps of:

calculating $B_s$ according to the equation $$B_s = \frac{B_m}{B_r};$$

calculating a lens width scaled by the lens height scale ($A_{wrap}$) according to the equation $$A_{wrap} = \frac{A_m + \frac{1}{2}DBL_m}{B_s};$$

calculating a wrap angle (WA) according to the equation $$WA = \cos^{-1}\frac{A_r + \frac{1}{2}DBL_r}{A_{wrap}};$$

and
displaying WA on the user interface.

* * * * *